United States Patent
Chen et al.

(10) Patent No.: US 10,102,299 B2
(45) Date of Patent: *Oct. 16, 2018

(54) FILE TRANSMISSION METHOD, FILE TRANSMISSION APPARATUS AND FILE TRANSMISSION SYSTEM

(71) Applicant: Acer Incorporated, New Taipei (TW)

(72) Inventors: Ching-Ping Chen, New Taipei (TW); Huang-Kai Chen, New Taipei (TW); Chun-Chuan Lin, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/823,603

(22) Filed: Nov. 28, 2017

(65) Prior Publication Data

US 2018/0081979 A1    Mar. 22, 2018

Related U.S. Application Data

(63) Continuation of application No. 14/856,561, filed on Sep. 17, 2015, now Pat. No. 9,858,351.

(30) Foreign Application Priority Data

Apr. 30, 2015   (TW) .............................. 104113926 A

(51) Int. Cl.
*H04L 29/06*   (2006.01)
*G06F 17/30*   (2006.01)
*H04L 29/08*   (2006.01)

(52) U.S. Cl.
CPC .. *G06F 17/30879* (2013.01); *G06F 17/30115* (2013.01); *H04L 67/06* (2013.01); *H04L 69/22* (2013.01)

(58) Field of Classification Search
CPC ..................................................... H04L 69/22
USPC ......................................................... 709/226
See application file for complete search history.

*Primary Examiner* — Adnan M Mirza
(74) *Attorney, Agent, or Firm* — JCIPRNET

(57) ABSTRACT

A file transmission method, a file transmission apparatus, and a file transmission system are provided. The method is adapted for a first electronic apparatus to perform a file transmission operation with a second electronic apparatus. The method includes following steps: capturing a target image including a selection region displayed by the second electronic apparatus, wherein the selection region is displayed by the second electronic apparatus in response to a selection operation performed on at least one item displayed by the second electronic apparatus; identifying an encoded pattern located within the selection region in the target image, and decoding the encoded pattern to obtain connection information of the item; and transmitting at least one file with the second electronic apparatus according to the connection information.

10 Claims, 4 Drawing Sheets

FILE TRANSMISSION METHOD, FILE TRANSMISSION APPARATUS AND FILE TRANSMISSION SYSTEM

CROSS-REFERENCE TO RELATED APPLICATION

This application is a continuation application of and claims the priority benefit of U.S. patent application Ser. No. 14/856,561, filed on Sep. 17, 2015, now allowed, which claims the priority benefit of Taiwan application serial no. 104113926, filed on Apr. 30, 2015. The entirety of each of the above-mentioned patent applications is hereby incorporated by reference herein and made a part of this specification.

BACKGROUND OF THE INVENTION

Field of the Invention

The invention relates to a file transmission mechanism, and more particularly, to a file transmission method, a file transmission apparatus, and a file transmission system.

Description of Related Art

With the blooming development of the Internet and information technology, users often own multiple electronic apparatuses. Accordingly, there are increasing demands from users for managing electronic files between multiple apparatuses. In one aspect, users are able to transmit files via a transmission cable connected between the apparatuses, or access the files via an external storage medium/apparatus. In another aspect, users are also able to perform a file transmission between multiple apparatuses by ways of an electric mail, a cloud storage space and the like via the Internet. However, each of conventional file transmission methods as described above has its own limitations.

For instance, when the transmission cable or the external storage medium/apparatus are used to perform the file transmission between the apparatuses, users need to carry the additional transmission cable or the external storage medium/apparatus in order to perform operations for the file transmission between the apparatuses. As another example, when the cloud storage space or the electronic mail are used to perform the file transmission between the apparatuses, in addition to registration or log-in procedures for the cloud storage space or the electronic mail, users also need to take into consideration of space limitation of the cloud storage space/the electronic mail as well as the security issues.

SUMMARY OF THE INVENTION

Accordingly, the invention is directed to a file transmission method, a file transmission apparatus and a file transmission system, in which connection information of an item selected by a user is hidden in a selection region so that a file transmission operation between apparatuses can be realized by the user simply utilizing another apparatus to capture an image of the selection region and interpret the connection information in the image.

The file transmission method of the invention is adapted for a first electronic apparatus to perform a file transmission operation with a second electronic apparatus. The method includes the following steps: capturing a target image including a selection region displayed by the second electronic apparatus, wherein the selection region is displayed by the second electronic apparatus in response to a selection operation performed on at least one item displayed by the second electronic apparatus; identifying an encoded pattern located within the selection region in the target image, and decoding the encoded pattern to obtain connection information of the item; and transmitting at least one file with the second electronic apparatus according to the connection information.

The file transmission apparatus of the invention includes an image capturing module, a decoding module and a file transmission module. The image capturing module captures a target image including a selection region displayed by a second electronic apparatus, in which the selection region is displayed by the second electronic apparatus in response to a selection operation performed on at least one item displayed by the second electronic apparatus. The decoding module identifies the encoded pattern located within the selection region in the target image, and decodes the encoded pattern to obtain the connection information of the at least one item. The file transmission module transmits at least one file with the second electronic apparatus according to the connection information.

The file transmission system of the invention includes a first electronic apparatus and a second electronic apparatus. The second electronic apparatus includes a selection identifying module, an encoding module and a display module. Herein, the file selection identifying module displays a selection region around at least one item in correspondence to the at least one item tapped by a selection operation, or displays the selection region in correspondence to a circled region of the at least one item circled by the selection operation. The encoding module extracts connection information of each of the at least one item, and encodes the connection information of the at least one item to generate an encoded pattern. The displaying module displays the encoded pattern in the selection region. The first electronic apparatus includes an image capturing module, a decoding module and a file transmission module. Herein, the image capturing module captures a target image including the selection region displayed by the second electronic apparatus. The decoding module identifies the encoded pattern located within the selection region in the target image, and decodes the encoded pattern to obtain the connection information of the at least one item. The file transmission module transmits at least one file with the second electronic apparatus according to the connection information to perform a file transmission operation between the first electronic apparatus and the second electronic apparatus.

Based on the above, according to the file transmission method, the file transmission apparatus and the file transmission system provided by the invention, after the item in one electronic apparatus is selected by the user, the electronic apparatus encodes the connection information of the selected item into an encoded pattern and displays the encoded pattern within the selected region of the user. Accordingly, the user only needs to use another electronic apparatus to capture an image including the selection region and decode the encoded pattern in the image, so that the connection information of the item may be obtained and used to transmit file with the electronic apparatus. As a result, the user may transmit the file between the apparatuses more conveniently and intuitively.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
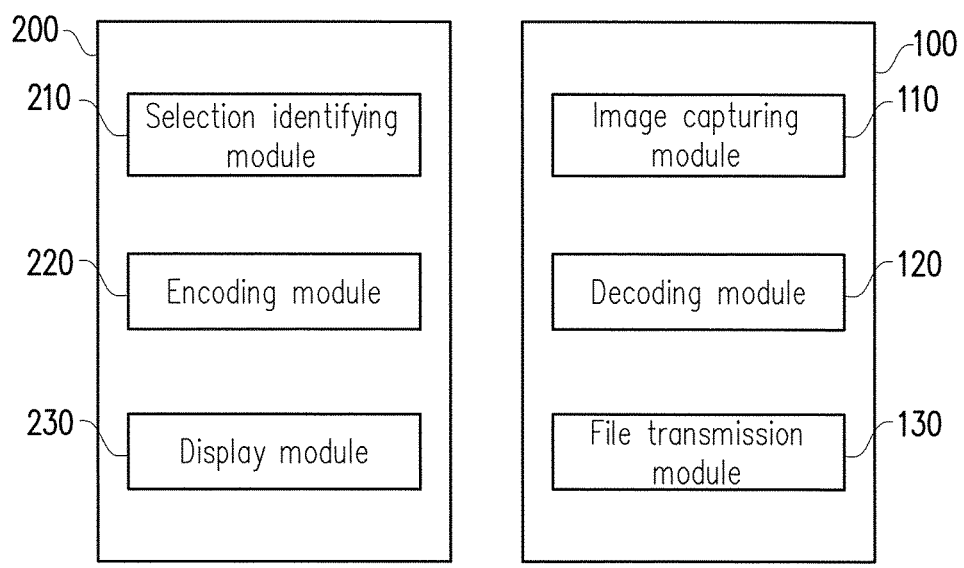
FIG. 1 is a block diagram illustrating a file transmission system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In general, when a user selects or circles an item (e.g., a file, a folder or a directory) on an electronic apparatus, the electronic apparatus displays one selection region on the selected item. The invention utilizes the displayed selection region to carry a pattern encoded by connection information of the selected item. Accordingly, the user may utilize another electronic apparatus to capture an image of the selection region, and interpret the connection information from the encoded pattern in the image, so as to connect the electronic apparatus for transmitting data. By using a simple method of capturing image, the invention may allow the user to transmit file between the apparatuses in a simple and intuitive manner.

FIG. 1 is a block diagram illustrating a file transmission system according to an embodiment of the invention. A file transmission system 10 comprises a plurality of file transmission apparatuses. Herein, said file transmission apparatuses are, for example, a computer apparatus with capabilities of computing, communicating and image-capturing (e.g., a server, a work station or a personal computer, etc.), or a mobile apparatus (e.g., a cell phone or a tablet computer, etc.). In the present embodiment, for clearer illustration, an example of two file transmission apparatuses is provided, in which a first electronic apparatus 100 is used as a mobile apparatus and a second electronic apparatus 200 is used as the personal computer, but the invention is not limited thereto. In other embodiments, the file transmission system 10 may also include one workstation and two cell phones, or other apparatuses.

The first electronic apparatus 100 includes an image capturing module 110, a decoding module 120 and a file transmission module 130. The second electronic apparatus 200 includes a selection identifying module 210, an encoding module 220 and a display module 230. In the present embodiment, the modules are, for example, programs or software stored in storage units of the first electronic apparatus 100 or the second electronic apparatus 200, and the modules can be loaded by processing units of the first electronic apparatus 100 or the second electronic apparatus 200 and executed by the processing units in order to realize a file transmission method according to the embodiments of the invention. On the other hand, in another embodiment, the modules may also be implemented as circuits respectively having functions of the modules for realizing the file transmission method according to the embodiments of the invention.

The storage unit is, for example, a fixed or a movable device in any possible forms including a random access memory (RAM), a read-only memory (ROM), a flash memory or other similar devices, or a combination of the above-mentioned devices. It should be noted that, in the present embodiment, the storage unit is not limited to be one single memory device. Said modules may also be stored separately in two or more of memory devices of the same or different types.

The processing unit is coupled to the storage unit. The processing unit is, for example, a central processing unit (CPU) of single-core or multi-core or other programmable devices for general purpose or special purpose such as a microprocessor, a digital signal processor (DSP), a programmable controller, an application specific integrated circuit (ASIC) or other similar elements or a combination of above-mentioned elements. In the present embodiment, the processing unit is configured to access and execute the modules recorded in the storage unit, so as to realize the file transmission method according to the embodiments of the invention. In the present embodiment, the processing unit is not limited to be implemented by only one single processing device but also two or more processing devices.

Figure 2:
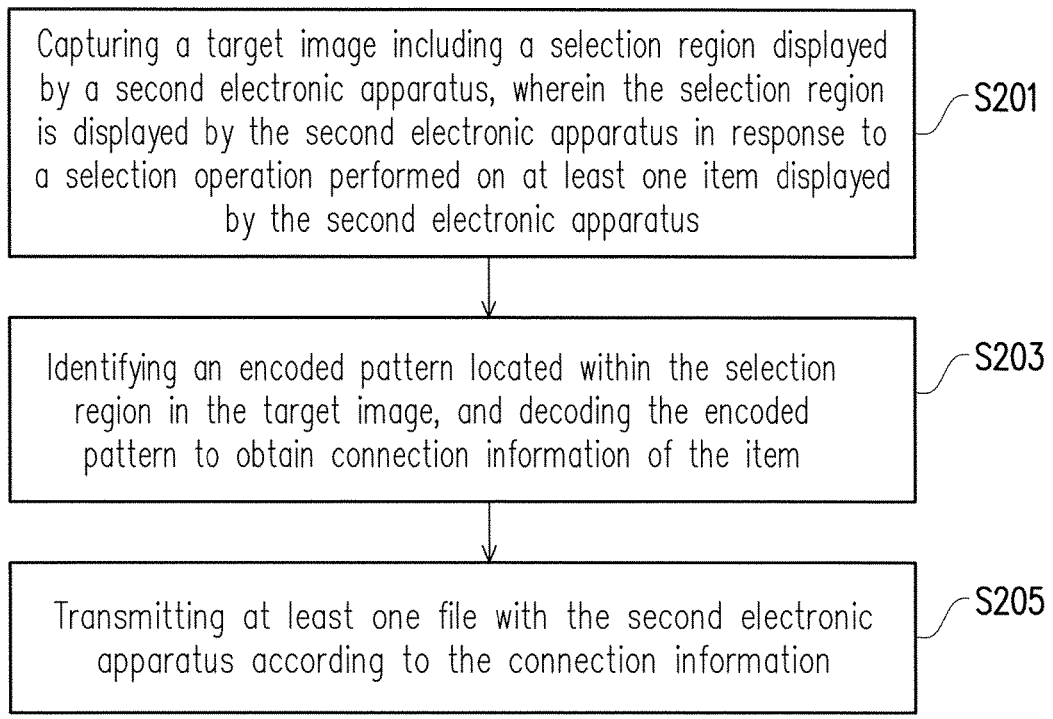
FIG. 2 is a flowchart illustrating a file transmission method according to an embodiment of the invention.

FIG. 2 is a flowchart illustrating a file transmission method according to an embodiment of the invention. Referring to FIG. 1 and FIG. 2 together, the method of the present embodiment is adapted for the file transmission system 10 of FIG. 1. Detailed steps in the file transmission method of the present embodiment are described below with reference to each element of the file transmission system 10 depicted in FIG. 1.

First, in step S201, the image capturing module 110 of the first electronic apparatus 100 captures a target image including a selection region displayed by the second electronic apparatus 200. Herein, the selection region is displayed by the second electronic apparatus 200 in response to a selection operation performed by the user on at least one item displayed by the second electronic apparatus.

Specifically, in the case where the user intends to perform a file transmission operation on the at least one item of the second electronic apparatus 200, the user first selects the item for the file transmission operation, so that the second electronic apparatus 200 displays one selection region on a screen of the second electronic apparatus. The image capturing module 110 shoots a frame displayed on the screen of the second electronic apparatus 200 through an image capturing apparatus of the first electronic apparatus 100 in order to capture the target image which includes the selection region displayed by the second electronic apparatus 200. The image capturing apparatus is a hardware apparatus configured to capture images. For example, the image capturing apparatus includes an optical fixed-focus lens or an optical zoom lens, and an optical sensing element such as a Charge Coupled Device (CCD) or a Complementary Metal-Oxide Semiconductor (CMOS). It should be noted that, the image capturing apparatus may also be a camera or a camcorder coupled to the first electronic apparatus 100 in any manner.

A method for generating a selection region is described in details below with reference to FIG. 3.

Figure 3:
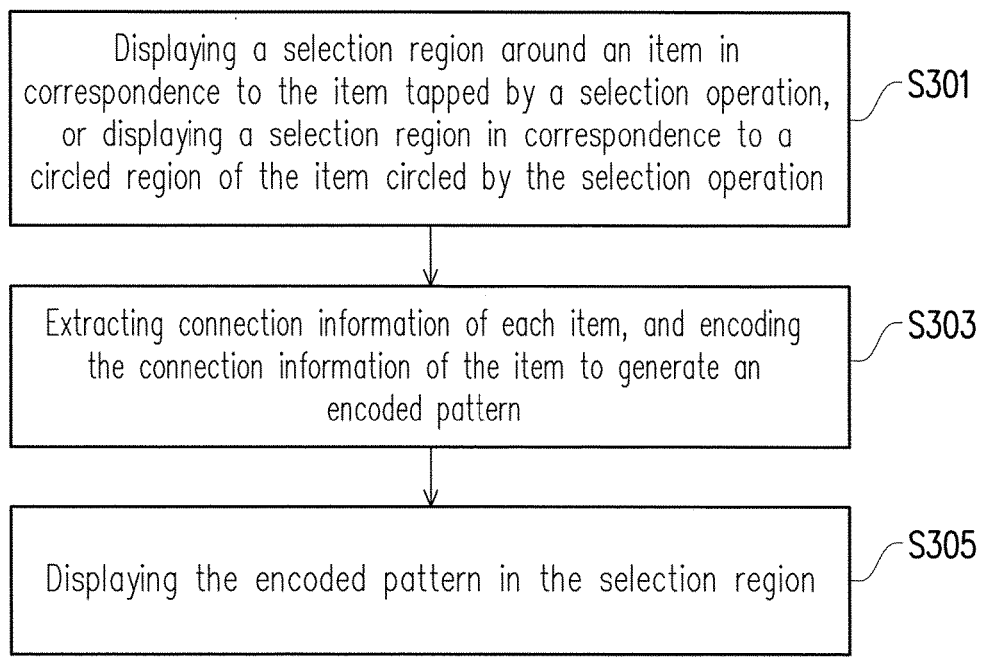
FIG. 3 is a flowchart illustrating the method for generating a selection region according to an embodiment of the invention.

FIG. 3 is a flowchart illustrating the method for generating a selection region according to an embodiment of the invention. Referring to FIG. 1 and FIG. 3 together, in the present embodiment, the file selection identifying module 210 of the second electronic apparatus 200 displays a selection region around an item in correspondence to the item tapped by a selection operation, or displays the selection region in correspondence to a circled region of the item circled by the selection operation (step S301).

For instance, in the case where the user intends to perform the file transmission operation on the item of the second electronic apparatus 200, the user first performs the selection operation by using the second electronic apparatus 200 to confirm the item corresponding to the file transmission operation to be performed later on. In the present embodiment, the selection operation is, for example, a selection operation method supported by the second electronic apparatus 200 (e.g., keyboard inputting, mouse clicking or touch sensing) and used by the user to select the item on which the file transmission operation is to be performed, or methods utilizing mouses or touch sensing, which are used by the user to select the item to which the file transmission operation is performed.

When the item is selected by tapping, generally, as in response to the selection operation, an operating system may have a current state of the item indicated as "selected" by highlighting or changing a color of an item name, a background image or a thumbnail image for the selected item. In other words, the color of a region around the file name or the item changes when the item is selected, so that one selection region may be displayed for the user to clearly identify the selected item.

Further, assuming that the user selects the item by using the mouse to circle the item, the user uses the mouse to create a circled region in rectangular shape, so that the second electronic apparatus 200 may display one selection region within the circled region in response to the items included in the circled region. It should be noted that, the invention is not limited by the selection operation as described above. For example, in another embodiment, the user may also use the touch sensing method to select the items by drawing a circle or performing a multi-touch to define a circled region. As another example, the user may use the conventional selection operation (e.g., keyboard inputting) to select the items.

In general, each electronic apparatus has one operating system for managing files. The files in the second electronic apparatus 200 may be stored in different directories or folders according to a configuration of the operation system of the second electronic apparatus 200. In the present embodiment, the selected item may be the directory, the folder or the file of the second electronic apparatus 200. In other words, the user may perform the selection operation on the directory, the folder or the file in the second electronic apparatus 200.

In the present embodiment, after execution of the selection operation is completed, the encoding module 220 of the second electronic apparatus 200 may extract connection information of each item, and encode the connection information of the item to generate an encoded pattern (S303).

For instance, in the case where the user performs the selection operation on multiple items, the file selection identifying module 210 identifies each of the selected items in the selection operation and obtains the connection information corresponding to each of the items. The file selection identifying module 210 transmits the connection information corresponding to each of the items to the encoding module 220. The encoding module 220 extracts the connection information corresponding to each of the items, and encodes the connection information of the selected items to generate the encoded pattern.

In the present embodiment, the connection information includes a file path of at least one file corresponding to the selected item stored in the second electronic apparatus 200 and a network address of the second electronic apparatus 200. The file path is, for examples, a logical address or a physical address of the selected item stored in the second electronic apparatus 200. The network address is, for example, used to indicate an IP address on the Internet or a network name on a local area network (LAN) of the second electronic apparatus 200, or other information configured to represent the second electronic apparatus 200 in a network system. Among them, the connection information may allow other electronic apparatus located in the same communication system (or network system) to locate the second electronic apparatus 200 through the information for establishing a communication connection (or a network connection). In other words, the connection information includes the information (the network address) configured for allowing the first electronic apparatus 100 to establish the network connection with the second electronic apparatus 200, and the address information (e.g. the file path) of the item of the second electronic apparatus 200 on which the file transmission operation is to be performed. It should be noted that, in order to facilitate illustration, the file transmission method of the invention is described by using establishment of the network connection in the following embodiments.

According to the connection information of each of the selected items, the encoding module 220 generates the encoded pattern in one-dimensional or two-dimensional forms by using, for example, the bar code algorithm, the quick response code (QR code) or other suitable dot encoding algorithms. Generating the encoded pattern by using the bar code algorithm or the QR code algorithm belongs to the conventional technology, and thus related description is omitted herein.

In the present embodiment, the encoding module first divides the encoded pattern into a plurality of zones by using a preset dot encoding algorithm. After dividing the zones, for each of the zones, a part of the zones is selected to serve as a label zone while the remaining zones are selected to serve as a data zone. Subsequently, the encoding module 220 starts to dispose (arrange) dot pixels in the zones. The dot pixels disposed in the data zone are arranged according to the dot encoding algorithm and the connection information, and different dot pixel arranging methods and arranging patterns may constitute data information of the dot encoding. The data information may be decoded and restored back to the connection information of the selected items. The dot pixels disposed in the label zone are used to constitute label information of the dot encoding, wherein the label information is configured to define a size, a position and/or a shape of the encoded pattern, so as facilitate subsequent decoding operation for the data information. It is noted that, in the encoded pattern formed by the dot pixels arranged according to the dot encoding, differences among the arranging methods of the dot pixels cannot be easily perceived by the user. In other words, in the embodiments of the invention, the encoded data information may be hidden in the frame without influencing visual sense of the user by the encoded pattern generated by the dot encoding.

After the encoded pattern is generated, the display module 230 displays the encoded pattern in the selection region (S305). Specifically, in the present embodiment, because the generated encoded pattern has a fixed size, the display module 230 may perform a zoom-in or zoom-out action on the generated encoded pattern so that the encoded pattern may be properly displayed within the selection region. In another exemplary embodiment, during the process of generating the encoded pattern, the encoding module 220 may generate the encoded pattern matching the displayed selection region according to a size of the selection region and then the display module 230 displays the encoded pattern in the selection region, but the invention is not limited thereto. For example, in another embodiment, the display module 230 may display the encoded pattern within the selection region by adopting other displaying methods like repeatedly displaying or parallel displaying the encoded pattern instead of using the zoom-in or zoom-out method.

Referring back to FIG. 1 and FIG. 2, in the present embodiment, after the target image is captured by image capturing module 110, in step S203, the decoding module 120 automatically identifies the encoded pattern located within the selection region in the target image, and decodes the encoded pattern to obtain the connection information of the item.

Specifically, the decoding module 120 analyzes the arrangement of all pixels in the target image. As described above, the dot pixels disposed in the label zone are used to constitute the label information of the dot encoding, wherein the label information is configured to define the size, the position and the shape of the encoded pattern. Accordingly, the decoding module 120 identifies the encoded pattern in the target image according to an arrangement and a disposition pattern of the dot pixels disposed in the label zone, and then obtains the size, the position and the shape of the encoded pattern. It should be noted that, the preset dot encoding algorithm uses a preset rule to divide the label zone and the data zones in the encoded pattern. Accordingly, after identifying the label zone of the encoded pattern in the target image, the decoding module 120 may also identify the data zone and the dot pixels within the data zone. Next, according to the arrangement and the disposition pattern of the dot pixels disposed in the data zone, the decoding module 120 decodes the encoded pattern by using the preset dot encoding algorithm so as to obtain the connection information of the item.

After the connection information of the item is obtained, in step S205, the file transmission module 130 of the first electronic apparatus 100 transmits at least one file with the second electronic apparatus 200 according to the connection information.

In the present embodiment, the file transmission operation between the first electronic apparatus 100 and the second electronic apparatus 200 may be separated into a file uploading operation where the first electronic apparatus 100 uploads the file to the selected item of the second electronic apparatus 200, and a file downloading operation where the first electronic apparatus 100 downloads the file from the selected item of the second electronic apparatus 200.

During said file downloading operation, the file transmission module 130 connects the second electronic apparatus 200 according to the connection information to download the at least one file corresponding to each of the at least one item from the second electronic apparatus.

Specifically, as described above, the connection information includes the network address of the second electronic apparatus. Accordingly, the file transmission module 130 of the first electronic apparatus 100 can establish the network connection with the second electronic apparatus 200 by a communication unit according to the connection information. The communication unit is coupled to the processing unit and configured to connect to a network (e.g., a telecommunication network, the Internet, etc.). In the present exemplary embodiment, the communication unit supports the WiFi communication protocol. However, the invention is not limited to the above, and the communication unit may also support other communication protocols at the same time. For example, the communication unit is composed of a plurality of circuits, and the circuits support wireless communication modules of bluetooth, Near Field Communication (NFC), or 3rd Generation Partnership Project (3GPP) standards, respectively. In addition, the communication unit may also include a wired communication unit which transmits or receives data by ways of a wired communication. For example, in another embodiment, the communication unit is a network interface card (NIC) which connects to the Internet via a network cable or establishes the network connection with a communication unit of another electronic apparatus in a peer-to-peer (P2P) fashion.

After establishing the network connection, the file transmission module 130, for example, displays one file transmission button on the first electronic apparatus 100, and determines whether the file transmission button is triggered by the user. If the file transmission button is triggered, the file transmission module 130 downloads a file corresponding to the selected item from the second electronic apparatus 200 to the first electronic apparatus 100 via the established network connection.

On the other hand, the network connection may also be used to upload the file. Specifically, the user may select at least one file on the first electronic apparatus 100, and then after the network connection is established or the file transmission button is triggered, the file transmission module 130 performs aforesaid file uploading operation to connect the second electronic apparatus 200 according to the connection information and upload the selected file on the first electronic apparatus 100 to each of the items (e.g., the directory or the folder) of the second electronic apparatus 200.

The invention is not limited by aforesaid implementation for transmitting file. For example, in another embodiment, the electronic apparatus may directly perform the file transmission operation right after obtaining the connection information. In yet another embodiment, there is no distinction between uploading and downloading for the file transmission button, and the file transmission module 130 may automatically determine the file transmission operation that the user intends to perform is the file uploading operation or the file downloading operation when the file transmission button is triggered based on whether there is file selected on the first electronic apparatus 100 or not.

Figure 4:
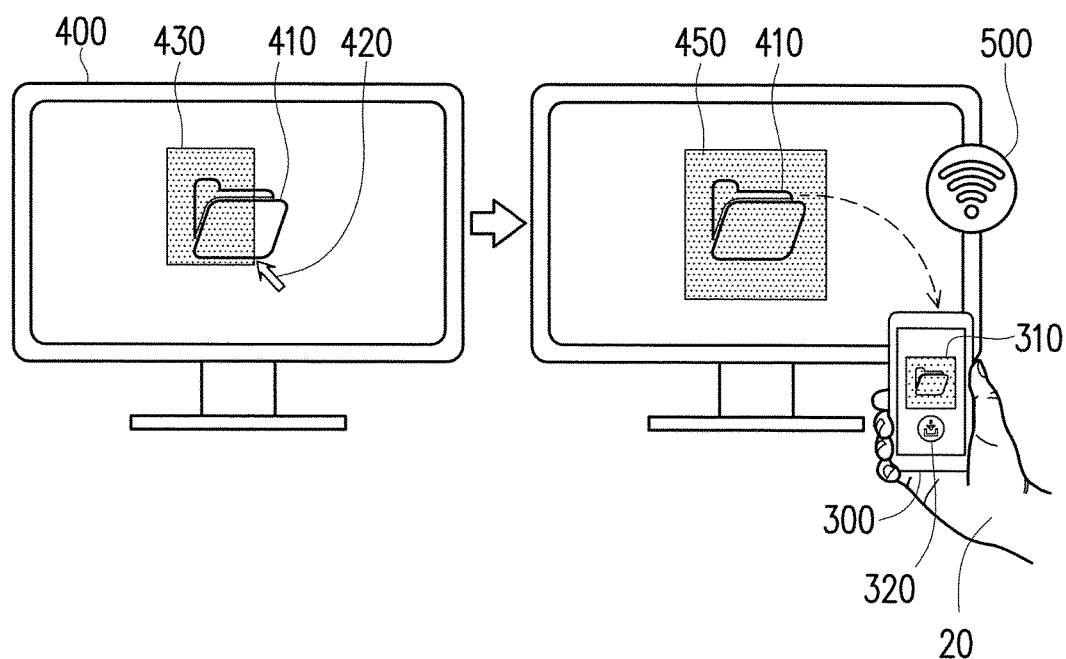
FIG. 4 is a schematic diagram illustrating a file transmission method according to an embodiment of the invention.

FIG. 4 is a schematic diagram illustrating a file transmission method according to an embodiment of the invention. Referring to FIG. 4, for instance, it is assumed that the user intends to download a file of an item 410 from a second electronic apparatus 400. A user 20 may select the item 410 on the second electronic apparatus 400 by using a mouse cursor 420, so as to perform a selection operation 430 of the item 410. After the selection operation for the item 410 is completed, the second electronic apparatus 400 displays a selection region 450 having an encoded pattern on the selected item 410. The user 20 may shoot a display frame 440 of the second electronic apparatus 400 by using an image capturing apparatus of a first electronic apparatus 300 so as to capture an image 310 including the selection region 450 displayed by the second electronic apparatus 400. The first electronic apparatus 300 automatically identifies and decodes the encoded pattern in the image 310 to obtain connection information, displays a file transmission button 320 in a display frame of the first electronic apparatus 300, and establishes a network connection 500 between the first electronic apparatus 300 and the second electronic apparatus 400 according to the connection information. When the user taps on the file transmission button 320 to trigger file transmission functions, the first electronic apparatus 300 downloads the file of the selected item 410 in the second electronic apparatus 400 via the established network connection 500. Accordingly, the user is able to intuitively and conveniently complete the file transmission operation for downloading the file of the item 410 from the second electronic apparatus 400 to the first electronic apparatus 300.

It should be noted that, although the file transmission method of the present embodiment is realized by implementing the image capturing module 110, the decoding module 120 and the file transmission module 130 stored in the storage unit of the first electronic apparatus 100 and implementing the file selection identifying module 210, the encoding module 220 and the display module 230 stored in the second electronic apparatus 200, the invention is not limited to the above. For example, the storage units of the first electronic apparatus 100 or the second electronic apparatus 200 may store program codes including all the modules as mentioned above. As such, the file transmission operations between the first electronic apparatus 100 and the second electronic apparatus 200 may be performed more conveniently.

It is worth mentioning that, as described above, in another embodiment, the modules may also be implemented as the circuit units respectively having the functions of the modules. In other words, the file transmission method according to the embodiments of the invention may also adopt use of hardware circuits to achieve the same functions. For example, the function of the image capturing module 110 may be implemented as an image capturing circuit. The image capturing circuit is coupled to (or integrated to) said image capturing apparatus and configured to shoot and obtain the target image by using the image capturing apparatus and then transmit the target image to a decoding circuit. The function of the file transmission module 130 may be implemented as a file transmission circuit, which is, for example, the network interface card (NIC) or the wireless communication module that transmits the file in a wireless manner or a wired manner. The function of the file selection identifying module 210 may be implemented as a file selection identifying circuit. The function of the decoding module 120 may be implemented as the decoding circuit, and the function of the encoding module 220 may be implemented as an encoding circuit. It should be noted that, in another embodiment, the encoding circuit and the decoding circuit may also be integrated into one encoding/decoding circuit.

As another example, the function of the display module 230 may be implemented as a display circuit, which is coupled to (or integrated to) a display of the second electronic apparatus and configured to display the selection region having the encoded pattern by using the display of the second electronic apparatus in response to the selection operation on the second electronic apparatus 20. The display is, for example, a liquid-crystal display (LCD), a light-emitting diode (LED) display, or a field emission display (FED). The display may also be a touch display composed of a display panel of aforesaid types or other types and a touch panel (e.g., resistive type touch panel, capacitive touch panel or optical type touch panels) which is capable of providing functions of display and touch operation at the same time, or may be other displays for providing the display function, which are not particularly limited in the invention. Furthermore, the file transmission method according to the embodiments of the invention may be realized by coupling each of the different circuits to the processing unit.

In summary, according to the file transmission method, the file transmission apparatus and the file transmission system provided by the invention, after the item in one electronic apparatus is selected, the connection information of the selected item in said electronic apparatus is encoded into the encoded pattern, and one selection region having the encoded pattern is displayed around the selected item. Further, in the embodiments of the invention, the image including the selection region displayed by the electronic apparatus is further captured by another electronic apparatus, and the encoded pattern in the image is decoded to obtain the connection information corresponding to the item so that the another electronic apparatus may transmit the file with the electronic apparatus according to the connection information. As a result, the user may transmit the file between the apparatuses more conveniently and intuitively.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A file transmission method, adapted for a first electronic apparatus to perform a file transmission operation with a second electronic apparatus, comprising:
    capturing a target image including a selection region displayed by the second electronic apparatus, wherein the selection region having an encoded pattern is displayed by the second electronic apparatus in response to a selection operation performed on at least one item displayed by the second electronic apparatus;
    identifying the encoded pattern located within the selection region in the target image, and decoding the encoded pattern to obtain connection information of the at least one item, wherein the encoded pattern, in response to the selection operation, is generated according to the connection information of the at least one item; and
    transmitting at least one file with the second electronic apparatus according to the connection information.

2. The file transmission method of claim 1, wherein the step of displaying the selection region by the second electronic apparatus in response to the selection operation performed on the at least one item displayed by the second electronic apparatus comprises:
    displaying the selection region around the at least one item in correspondence to the at least one item tapped by the selection operation, or displaying the selection region in correspondence to a circled region of the at least one item circled by the selection operation; and
    extracting the connection information of each of the at least one item, encoding the connection information of the at least one item to generate the encoded pattern, and displaying the encoded pattern in the selection region.

3. The file transmission method of claim 1, wherein the step of transmitting the at least one file with the second electronic apparatus according to the connection information comprises:

connecting the second electronic apparatus according to the connection information to download the at least one file corresponding to each of the at least one item from the second electronic apparatus.

4. The file transmission method of claim 1, wherein the step of transmitting the at least one file with the second electronic apparatus according to the connection information comprises:

connecting the second electronic apparatus according to the connection information to transmit the at least one file of the first electronic apparatus to each of the at least one item of the second electronic apparatus.

5. The file transmission method of claim 1, wherein the connection information comprises a file path of the at least one file stored in the second electronic apparatus in correspondence to each of the at least one item and a network address of the second electronic apparatus.

6. A file transmission apparatus, comprising:

an image capturing module, configured to capture a target image including a selection region displayed by a second electronic apparatus, wherein the selection region having an encoded pattern is displayed by the second electronic apparatus in response to a selection operation performed on at least one item displayed by the second electronic apparatus;

a decoding module, configured to identify an encoded pattern located within the selection region in the target image, and decode the encoded pattern to obtain connection information of the at least one item, wherein the encoded pattern, in response to the selection operation, is generated according to the connection information of the at least one item; and a file transmission module, transmitting at least one file with the second electronic apparatus according to the connection information.

7. The file transmission apparatus of claim 6, wherein the file transmission module connects the second electronic apparatus according to the connection information to download the at least one file corresponding to each of the at least one item from the second electronic apparatus.

8. The file transmission apparatus of claim 6, wherein the file transmission module connects the second electronic apparatus according to the connection information to transmit the at least one file of the first electronic apparatus to each of the at least one item of the second electronic apparatus.

9. The file transmission apparatus of claim 6, wherein the connection information comprises a file path of the at least one file stored in the second electronic apparatus in correspondence to each of the at least one item and a network address of the second electronic apparatus.

10. A file transmission system, comprising:

a second electronic device, comprising:

a file selection identifying module, configured to display a selection region around at least one item in correspondence to the at least one item tapped by a selection operation, or display the selection region in correspondence to a circled region of the at least one item circled by the selection operation, wherein the selection region has an encoded pattern;

an encoding module, configured to, in response to the selection operation, extract connection information of each of the at least one item, and encode the connection information of the at least one item to generate the encoded pattern, and a displaying module, configured to display the encoded pattern in the selection region; and a first electronic device, comprising:

an image capturing module, configured to capture a target image including the selection region displayed by the second electronic apparatus;

a decoding module, configured to identify the encoded pattern located within the selection region in the target image, and decode the encoded pattern to obtain the connection information of the at least one item; and a file transmission module, configured to transmit at least one file with the second electronic apparatus according to the connection information to perform a file transmission operation between the first electronic apparatus and the second electronic apparatus.

* * * * *